(12) United States Patent
Regna et al.

(10) Patent No.: US 6,824,449 B2
(45) Date of Patent: Nov. 30, 2004

(54) CLAMPING ASSEMBLY

(75) Inventors: Michael G. Regna, Rochester, NY (US); Sean C. Woodyard, Spencerport, NY (US); Eric G. Mundt, Rochester, NY (US)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 10/602,973

(22) Filed: Jun. 24, 2003

(65) Prior Publication Data

US 2004/0051258 A1 Mar. 18, 2004

Related U.S. Application Data

(60) Provisional application No. 60/392,163, filed on Jun. 27, 2002.

(51) Int. Cl.$^7$ .................................................. B24B 1/00
(52) U.S. Cl. ........................ 451/48; 451/371; 451/375
(58) Field of Search ........................ 451/48, 374, 375, 451/371

(56) References Cited

U.S. PATENT DOCUMENTS

| | | | | |
|---|---|---|---|---|
| 3,656,264 A | * | 4/1972 | Mackey et al. ............... 451/48 |
| 3,698,140 A | * | 10/1972 | Steadman .................... 451/438 |
| 3,868,101 A | | 2/1975 | Nozaki et al. |
| 3,881,889 A | | 5/1975 | Hunkeler |
| 3,916,570 A | * | 11/1975 | Caley ......................... 451/220 |
| 4,023,552 A | * | 5/1977 | Moores et al. ............. 125/11.21 |
| 4,365,444 A | * | 12/1982 | Chwae ........................ 451/216 |
| 4,483,104 A | * | 11/1984 | Welliver ..................... 451/375 |
| 4,485,596 A | * | 12/1984 | Bernard et al. ............. 451/375 |
| 4,575,285 A | | 3/1986 | Blakesley |
| 4,642,942 A | * | 2/1987 | Guhring ...................... 451/239 |
| 4,837,983 A | * | 6/1989 | Fuller, Jr. ...................... 451/8 |
| 4,860,497 A | * | 8/1989 | Ohya et al. ................. 451/232 |
| 4,969,298 A | | 11/1990 | Leutwyler et al. |
| 5,649,853 A | * | 7/1997 | Kuo .......................... 451/178 |
| 5,735,732 A | * | 4/1998 | Bernard ..................... 451/242 |
| 6,004,078 A | | 12/1999 | Clark et al. |
| 6,030,276 A | * | 2/2000 | Mortell et al. ................. 451/5 |

FOREIGN PATENT DOCUMENTS

| | | | |
|---|---|---|---|
| FR | 2779676 | | 12/1999 |
| GB | 1391758 | | 4/1975 |
| GB | 2186512 A | * | 8/1987 |
| SU | 1473906 A | * | 4/1989 |

* cited by examiner

*Primary Examiner*—M. Rachuba
(74) *Attorney, Agent, or Firm*—Robert L. McDowell

(57) ABSTRACT

An apparatus for clamping a workpiece in a machine. The apparatus comprises an inner nose portion being rotatable about an axis of rotation and comprising a plurality of mounting surfaces, and, an outer ring portion rotatable about the axis of rotation and comprising at least one clamp operable between an unclamped position and a clamped position. In the unclamped position, the inner nose portion is rotationally positionable about the axis relative to the clamp such that a workpiece positioned against the mounting surfaces may be oriented relative to the clamp to a position at which with the clamp being operated to the clamped position, the workpiece is clamped against the mounting surfaces. The clamping results in a coupling of the inner nose portion and the outer ring portion whereby with a clamped workpiece, the inner nose portion and the outer ring portion are rotatable together and are positionable about the axis.

8 Claims, 7 Drawing Sheets

CLAMPING ASSEMBLY

This application claims the benefit of U.S. Provisional Application No. 60/392,163 filed Jun. 27, 2002.

FIELD OF THE INVENTION

The present invention is directed to an assembly for clamping a workpiece in a machine tool. More particularly, the invention provides a means for clamping cutting blades in a sharpening or grinding machine.

BACKGROUND OF THE INVENTION

In machining operations utilizing a cutting tool, periodic sharpening (e.g. grinding of one or more surfaces of the cutting tool to restore a cutting edge) is a usual occurrence. It is common for the tool, or individual cutting blades thereof, to be removed from the particular machine and to then be positioned and clamped in a mounting block of a holding fixture in a sharpening machine for subsequent grinding. In many instances, such as where different tools or blades are of varying sizes or have shanks of different shapes or sizes, the mounting block must be modified or another installed in the sharpening machine. Such a procedure is time consuming and is usually labor intensive.

One type of known machining operation is the production of bevel gears with cutting tools comprising a plurality of stick-type cutting blades arranged in a cutter head. When the cutting blades are worn to a point where sharpening is necessary, the cutting blades may be removed from the cutter head and then clamped in a mounting block of a sharpening machine holding fixture such as illustrated in U.S. Pat. No. 3,881,889 to Hunkeler or U.S. Pat. No. 4,969,298 to Leutwyler et al. Sharpening of the cutting blades is then carried out by grinding the appropriate surfaces of the cutting blades in order to restore one or more desired cutting edges.

Stick-type cutting blades may vary in size and/or have different cross-sectional shapes thus presenting the likelihood of modifying existing mounting blocks or requiring different mounting blocks in a sharpening machine to accommodate the different blade sizes and/or shapes. For example, a cutting blade having a generally rectangular cross-sectional shank is shown in U.S. Pat. No. 4,575,285 to Blakesley. Cutting blades having more than four sides and including corner angles other than 90 degrees can be seen in U.S. Pat. No. 6,004,078 to Clark et al.

SUMMARY OF THE INVENTION

The present invention provides an apparatus for clamping a workpiece in a machine. The apparatus comprises an inner nose portion being rotatable about an axis of rotation and comprising a plurality of mounting surfaces, and, an outer ring portion rotatable about the axis of rotation and comprising at least one clamp operable between an unclamped position and a clamped position. In the unclamped position, the inner nose portion is rotationally positionable about the axis relative to the clamp such that a workpiece positioned against the mounting surfaces may be oriented relative to the clamp to a position at which, with the clamp being operated to the clamped position, the workpiece is clamped against the mounting surfaces. The clamping results in a coupling of the inner nose portion and the outer ring portion whereby with a clamped workpiece, the inner nose portion and the outer ring portion are rotatable together and are positionable about the axis.

DETAILED DESCRIPTION OF THE PREFERRED EMBODIMENT

The present invention will now be discussed with reference to preferred embodiments which illustrate the invention by way of example only. In all Figures, common components are referenced by like reference numbers.

Figure 1:
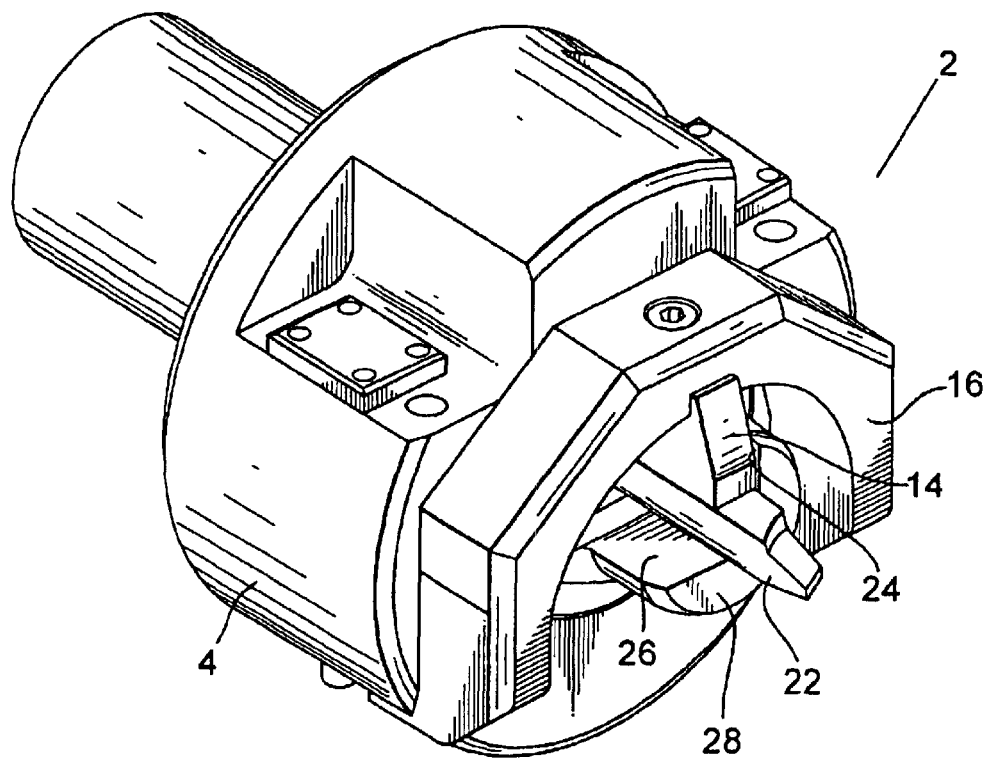
FIG. 1 is a perspective view of the inventive clamping assembly.
Figure 2:
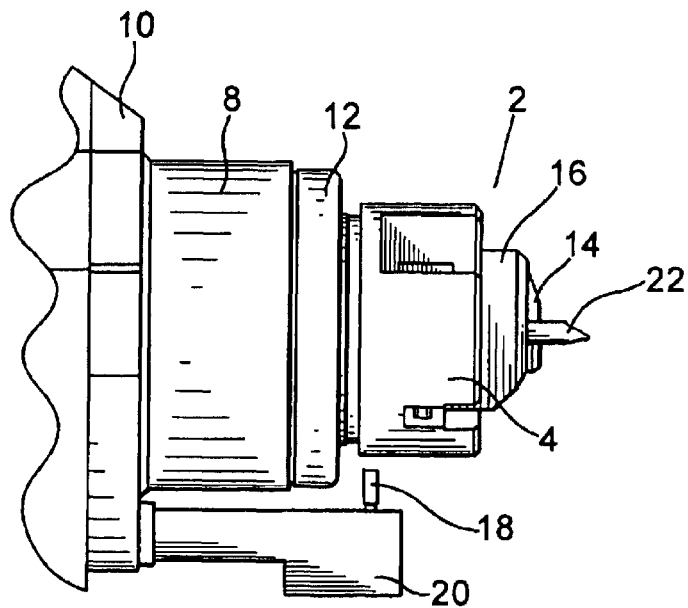
FIG. 2 is a side view of the inventive clamping assembly positioned on a machine spindle.
Figure 3:
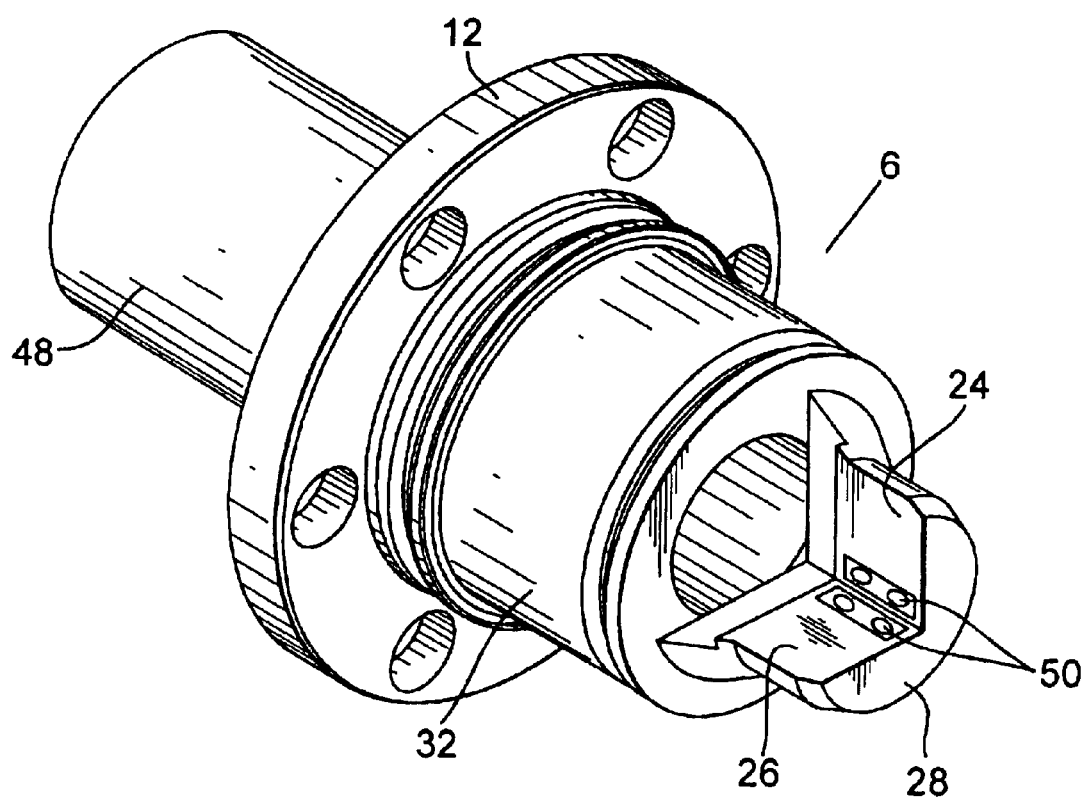
FIG. 3 illustrates the inner nose portion of the clamping assembly.
Figure 12:
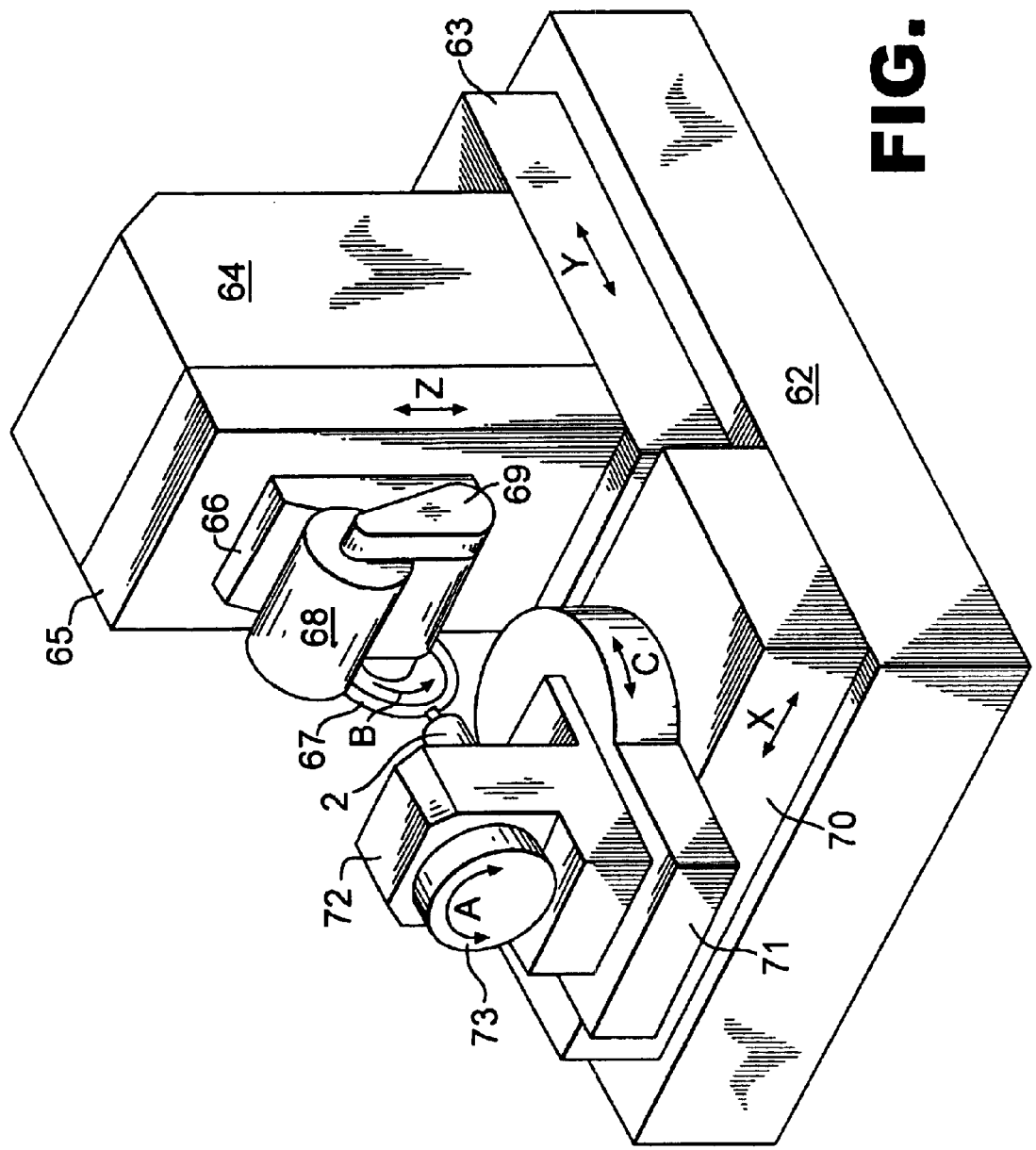
FIG. 12 illustrates one type of machine on which the inventive clamping assembly may be utilized.

FIG. 1 illustrates the inventive clamping assembly 2 comprising an outer ring portion 4 and an inner nose portion 6 (see FIG. 3). FIG. 2 shows clamping assembly 2 attached to the face of spindle 8 via a mounting plate 12. Spindle 8 is positioned in a spindle housing 10 of a machine such as a cutter blade sharpening machine. Such machines are well known in the art and are commercially available (an example of one type of machine is illustrated in FIG. 12 and described below). Outer ring portion 4 comprises at least one clamp 14 attached to clamp bracket 16. An outer ring locking piston 18 is mounted to piston mounting bracket 20. FIG. 1 further illustrates clamp 14 engaged with a cutting blade 22 to clamp it in position against mounting surfaces 24 and 26 (which together define a mounting slot) of mounting block 28 (see FIG. 3).

FIG. 3 illustrates the nose portion 6 of the present invention wherein mounting surfaces 24 and 26 are shown absent a cutting blade. Mounting surfaces 24 and 26 are preferably oriented 90 degrees with respect to one another but may be oriented at any angle desirable. One or both mounting surfaces 24, 26 may contain one or more ports 50 that communicate with a source of vacuum and or positive air pressure whereby vacuum may be applied to the ports 50 when positioning a cutting blade in mounting block 28 in order to assist with seating the cutting blade against mounting surfaces 24, 26 prior to clamping. Conversely, positive air (or other fluid) pressure may be applied to the ports 50 after the clamp 14 is withdrawn in order to loosen the cutting blade from the mounting surfaces 24, 26 and/or blow any grinding fluid or other debris away from the mounting surfaces.

Figure 4:
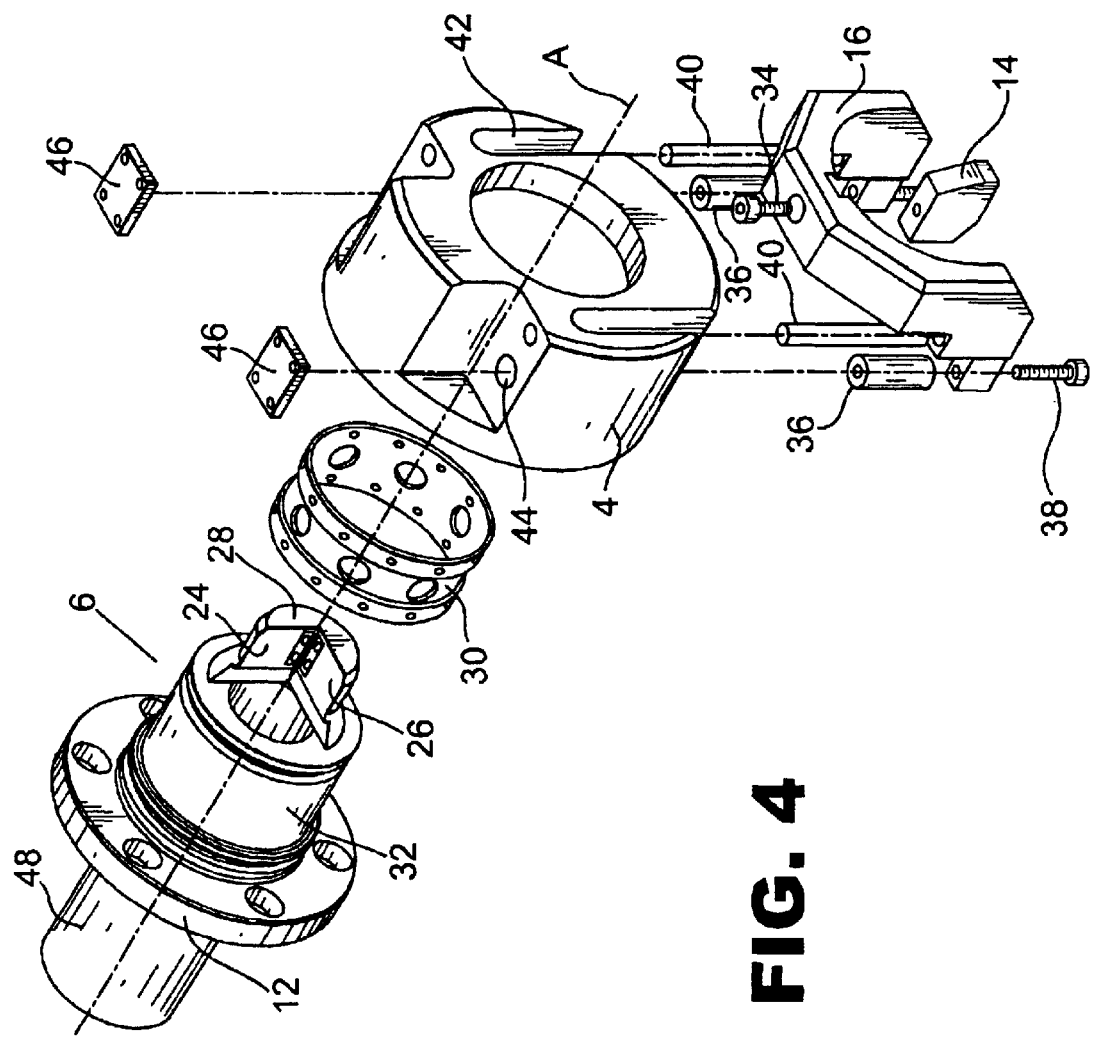
FIG. 4 illustrates the components of the clamping assembly.

FIG. 4 shows the components of the clamping assembly of FIGS. 1 and 2. The inner surface of outer ring portion 4 is positioned about inner nose portion 6 via a ball sleeve 30 located on seating surface 32. Ball sleeve 30 permits the outer ring portion 4 to be rotated freely about axis A and inner nose portion 6. As discussed above, outer ring portion 4 includes clamp 14 attached to clamp bracket 16 by any suitable means such as a bolt 34. Clamp bracket 16 and clamp 14 are movable to and from a clamping position by means of one or more pistons 36 attached to bracket 16 such as by bolts 38. Pistons 36 are positioned and movable within respective cylinders 44 that are each capped by cylinder plugs 46. Bracket 16 is guided via clamp guides 40 positioned and movable within guide cylinders 42.

Pistons 36 are preferably actuated by hydraulic pressure exerted by a piston (not shown) operating in piston cavity 48. The piston is in communication with a fluid reservoir (not shown) located in outer ring 4 which in turn communicates with pistons 36.

Figure 5:
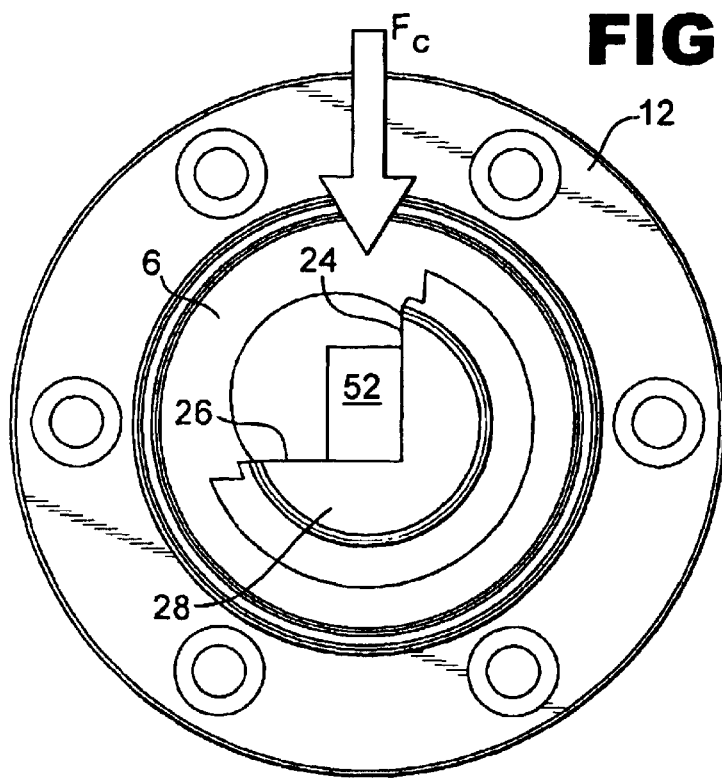
FIGS. 5 and 6 show rectangular cross-sectional cutting blades positioned in the clamping assembly.
Figure 6:
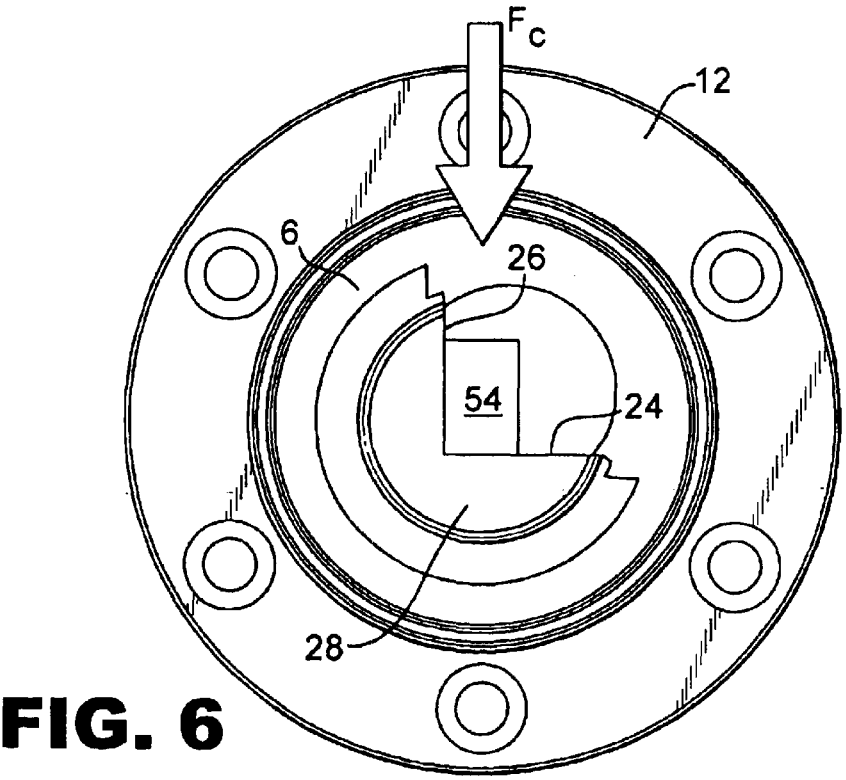

The present invention provides for the rotational (angular) position of the inner nose portion 6 to be controlled whereby the mounting block 28 can be positioned at any angular setting. For example, FIG. 5 shows a cutting blade 52 having a rectangular cross section positioned in mounting block 28 against mounting surfaces 24, 26. For this example, the illustrated position of the mounting block 28 shall be referred to as the 0° (zero degree) position. This position may be that as would be desired for sharpening cutting blades commonly referred to as "right hand" blades (the cutting blades rotate counter clockwise when viewed from the front of a cutting tool in which the blades are mounted). FIG. 6 on the other hand, shows the mounting block 28 rotated to the 90° position (with reference to FIG. 5). This position may be that as would be desired for sharpening a cutting blade 54 commonly referred to as a "left hand" blade (the cutting blades rotate clockwise when viewed from the front of a cutting tool in which the blades are mounted). In either instance, the force $F_C$ of the clamp 14 acts on a flat surface of the cutting blade to clamp the blade against the mounting surfaces 24, 26.

It can be understood when viewing FIGS. 5 and 6 that regardless of the cross-sectional size of the cutting blade, mounting block 28 can accommodate varying sizes of cutting blades and the angular position of the inner nose portion 6 can be oriented at any angle such that the clamping force can always act on a flat surface of a cutting blade. In FIGS. 5 and 6, the clamp force, $F_C$, is shown being applied vertically downward (when viewed along axis A). However, the clamp force can be located at any position about axis A and the inner nose portion can be rotated to a position whereby the surface of the cutting blade to be contacted by the clamp 14 is "lined up" with the direction of movement of the clamp whereby the clamp will contact the appropriate surface of the cutting blade to clamp it in the mounting block 28.

Figure 7:
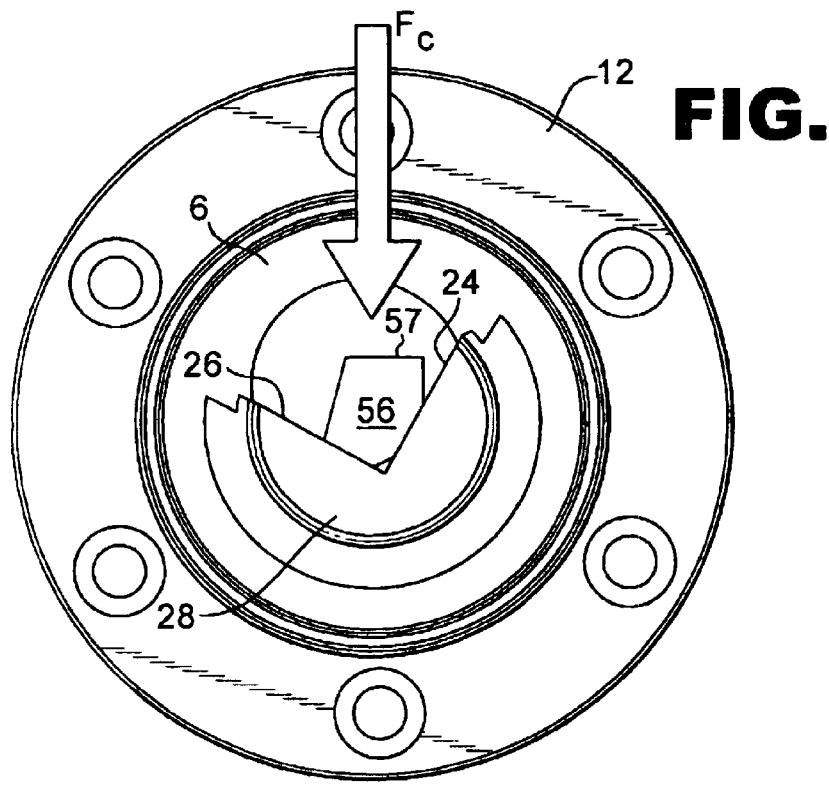
FIGS. 7 and 8 show cutting blades having more than four sides positioned in the clamping assembly.
Figure 8:
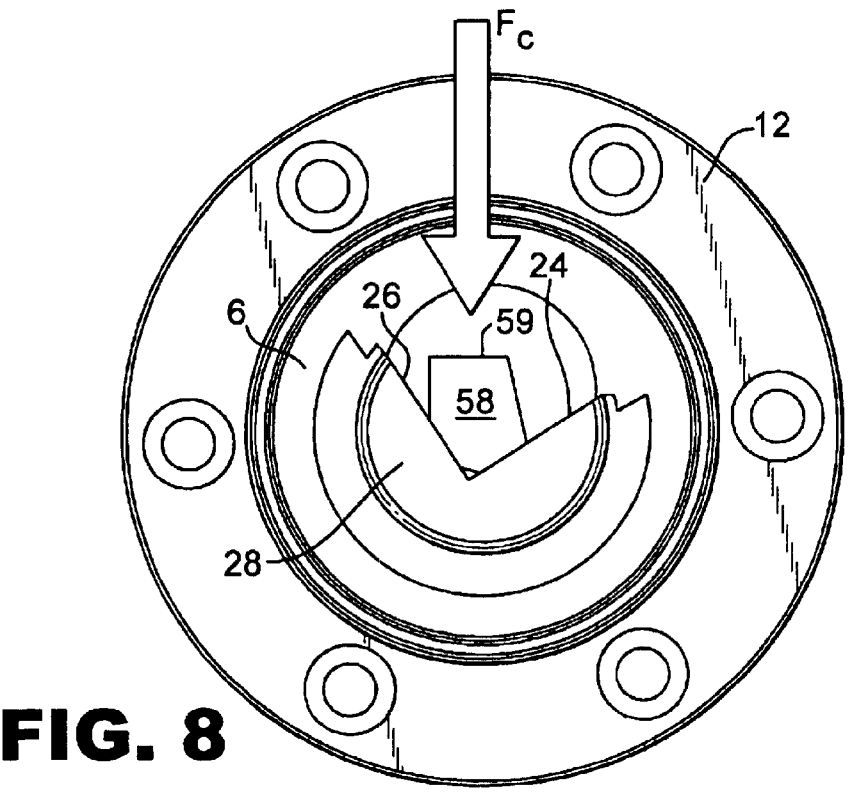

FIGS. 7 and 8 illustrate cutting blades having more than four sides, and hence a cross sectional that is not rectangular, such as those cutting blades disclosed in previously mentioned U.S. Pat. No. 6,004,078. These types of blades comprise angled surfaces oriented at less than 90 degrees and which terminate at a narrow end portion. FIG. 7 shows a right hand cutting blade 56 in which the side surfaces contacting respective mounting surfaces 24 and 26 extend at respective angles of 30° and 60° with respect to side surface 57. Cutting blade 56 is positioned in mounting block 28 which is then rotated 30° (with respect to the zero degree position seen in FIG. 5) to bring the side surface in line with the clamping force $F_C$.

Similarly, FIG. 8 shows a left hand cutting blade 58 in which the side surfaces contacting respective mounting surfaces 24 and 26 extend at respective angles of 60° and 30° with respect to side surface 59. Cutting blade 58 is positioned in mounting block 28 which is then rotated 60° (with respect to the zero degree position seen in FIG. 5) to bring the side surface in line with the clamping force $F_C$. Again, it can be seen that different cross-sectional shapes can be accommodated by the inventive clamping assembly. The angularly positionable mounting block 28 permits a cutting blade to be brought into position in line with a clamping force by controlled movement of the inner nose portion 6.

As described above, the present invention allows the use of a single mounting block with a fixed plurality (or set) of mounting surfaces for cutting blades of different sizes, shapes (e.g. four or more side surfaces) and hand (i.e. right hand and left hand).

Figure 11:
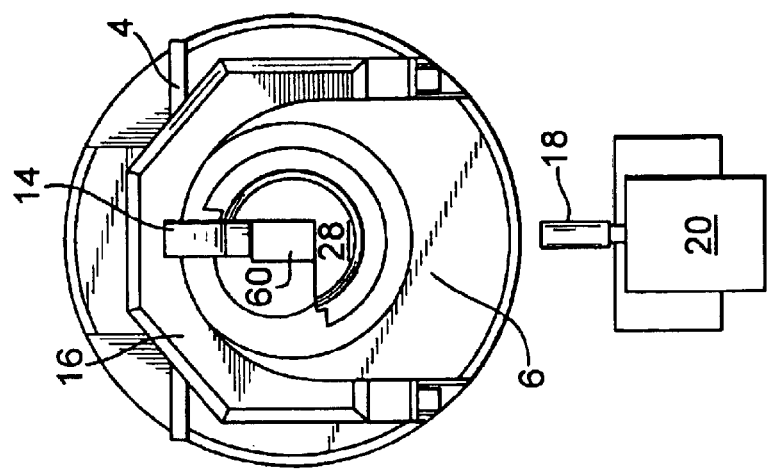
FIGS. 9, 10 and 11 illustrate a sequence of operations for clamping a cutting blade in the clamping assembly.
Figure 10:
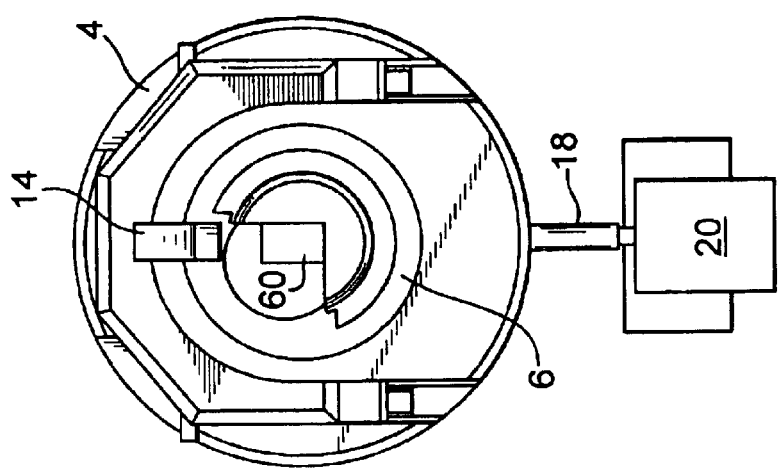
Figure 9:
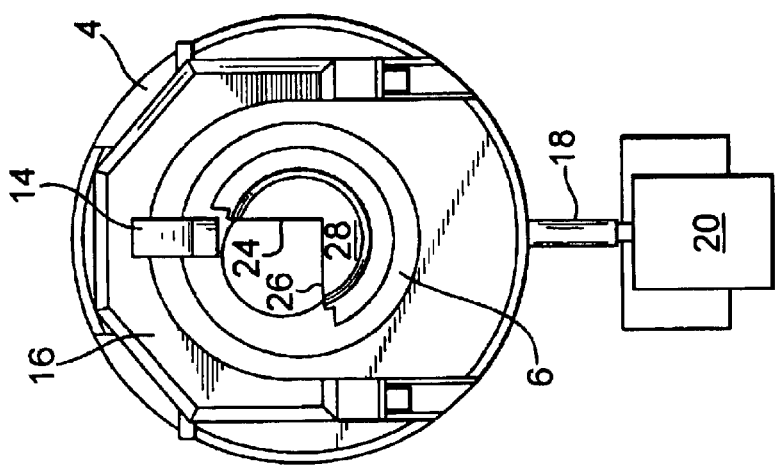

FIGS. 9–11 illustrate loading and clamping of a workpiece. In FIG. 9 the clamp 14 is fully retracted. The outer ring portion 4 is locked in position by contact with the locking piston 18. The inner nose portion 6 is now able to rotate independently of the outer ring portion 4 to an optimal load position. Vacuum to ports 50 is activated at this time.

In FIG. 10, a workpiece 60 (rectangular stick-type cutting blade) is manually or robotically loaded on to the mounting block 28 and in contact with the mounting surfaces 24, 26. Vacuum via ports 50 seats the cutting blade against the mounting surfaces. Vacuum can also be utilized to indicate to a machine controller (for example, computer numerical control, CNC) as to whether a workpiece is present or not.

FIG. 11 shows the clamp 14 in an advanced position to contact the workpiece and secure it in the mounting block 28. At this time, the locking piston 18 is retracted and since the outer ring portion 4 is now effectively coupled to the inner nose portion 6 by the clamping of the workpiece, the inner nose portion and the outer ring portion rotate as a single unit throughout the process of grinding the surfaces of the cutting blade 60.

When grinding is completed, the clamping assembly rotates to a desired unload position. The outer ring locking piston 18 is activated to contact the surface of the outer ring portion 4. Vacuum through port 50 is converted to positive pressure. Clamp 14 is withdrawn from contact with the cutting blade 60 and the cutting blade can be unloaded manually or robotically. The air purge helps with dislodging the workpiece as well as to blow off any kind of oil residue left on the surfaces 24, 26. The inner nose portion 6 can now rotate to a desired load position for the next workpiece and the process is repeated.

Although the illustrated examples show the clamping force oriented vertically downward with respect to the axis A of the clamping assembly, the outer ring portion 4 can be rotated to any angular position by clamping a cutting blade, or an insert of some kind, in the mounting block 28 and rotating the then singular unit to the desired position of the outer ring portion. Once in position, the outer ring portion 4 can be locked by contact of the locking piston 18 at which time the clamp 14 can be retracted and the inner nose portion 6 can then again rotate independently.

The angular position of the inner nose portion 6 is preferably controlled by an encoder (not shown) residing on the spindle 8 (FIG. 2) and communicating with the computer control of the particular machine. If desired, a stop mechanism may be included with the outer ring portion 4 in order to limit the extent of rotation. This may be desirable in the event that it is necessary to reorient the relative positions of the mounting surfaces 24, 26 and the clamp 14. By rotating the clamp 14 to a known end position, the machine controller can then know where the clamp is and can then direct the mounting block 28 with surfaces 24, 26 to align itself with the known position of the clamp 14. The clamp 14 can then be advanced against a cutting blade or other type of insert to couple the outer ring portion 4 to the inner nose portion 6 to form a single unit that can then be repositioned to any desired angular position for subsequent sharpening operations.

As mentioned above, the present invention may be utilized on any machine in which varying styles of cutting blades are ground. One example of such a machine is illustrated in FIG. 12. The machine is of the type having computer numerical control (CNC) and is described below. Machines of this type are well known in the art and are commercially available, such as, for example, the 300CG CNC Cutter Blade Sharpening machine manufactured by The Gleason Works, Rochester, N.Y.

The machine comprises a base 62 upon which a tool carriage 63 is mounted via slides or ways (not shown). The tool carriage 63 is movable on the slides along the machine base 62 in a direction Y (Y-axis). Located on tool carriage 63 is a tool column 64 to which is mounted tool slide 65, via ways or slides (not shown), for movement in a direction Z (Z-axis) perpendicular to the Y-axis movement of tool carriage 63. A tool head 66 is secured to tool slide 65 and an appropriate stock removing tool, such as a grinding wheel 67, is mounted for rotation to the tool head 66. The grinding wheel 67 is rotatable about an axis B and is driven by a motor 68 acting through suitable reduction gearing 69.

Also mounted via slides or ways (not shown) to machine base 62 is a first workpiece carriage 70 which is movable along the machine base 62 in a direction X (X-axis) perpendicular to both the Y-axis and Z-axis movements. A second workpiece carriage 71 is pivotally mounted to the first workpiece carriage 70 and is pivotable about an axis C. Secured to the second workpiece carriage 71 is workpiece column 72 in which a spindle (not shown) is journaled for rotation about axis A and is driven by motor 73. A blade holder such as the inventive clamping assembly 2 is mounted to the spindle for rotation about the A-axis.

Relative movement of the tool 67 and blade holder 2 along each of the mutually perpendicular axes X, Y, and Z is imparted by respective drive motors (not shown) which act through speed reducing gearing and recirculating ball screw drives (not shown). Pivoting of the second workpiece carriage 71 about the C-axis is imparted by a drive motor (not shown) acting through a worm which engages with a worm wheel carried by the pivotable workpiece carriage 71. The above-named components are capable of independent movement with respect to one another or may move simultaneously with one another.

Each of the respective drive motors, except the tool drive motor 68, is associated with either a linear or rotary encoder as part of a CNC system which governs the operation of the drive motors in accordance with input instructions input to a computer. The encoders provide feedback information to the computer concerning the actual positions of each of the movable machine axes. CNC systems for controlling the movement of multiple machine axes along prescribed paths are commonplace. Such state-of-the-art systems are incorporated in the machine to control relative movements of the grinding wheel and cutting blade along or about selected axes to describe desired paths for grinding (e.g. sharpening) stick-type cutting blades.

Although the present invention has been discussed with reference to sharpening of cutting blades (wherein existing cutting blade surfaces are ground to restore the desired surface geometry and edge conditions), it is to be understood that cutting blade blanks may also be clamped in the clamping assembly for subsequent grinding processes wherein the cutting blade blank is ground to produce desired surfaces (e.g. pressure angle, clearance angle, top relief angle, rake angle, etc.) and edge conditions (e.g. cutting edge, clearance edge, etc.) thereon. The latter process being commonly referred to as "block roughing" or "blank roughing."

While the plurality of mounting surfaces preferably defines a single slot in the mounting block (for example, two mounting surfaces forming a single mounting slot), the present invention contemplates two or more mounting slots positioned on the mounting block as well as the presence of more than two mounting surfaces defining a mounting slot. The preferred single slot embodiment is advantageous in that it eliminates setup changes that would otherwise be required and it allows for a compact configuration. The angular adjustability of the mounting block enables a single slot to be utilized for right and left hand cutting blades as well as varying shapes of the cutting blades.

It should also be understood that although the present invention has been exemplified by cutting blades utilized in the production of bevel gears, the inventive clamping assembly is not limited thereto. The present invention is applicable to any machine in which different styles of workpieces are machined and in which the inventive clamping assembly represents an advance over existing clamping means in that the need for different clamping assemblies for different styles of workpieces is reduced or eliminated.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. An apparatus for clamping a workpiece in a machine, said apparatus comprising:
   an inner nose portion comprising a plurality of mounting surfaces, said inner nose portion being rotatable about an axis of rotation,
   an outer ring portion comprising at least one clamp, said clamp being operable between an unclamped position retracted from a workpiece and a clamped position in contact with a workpiece wherein the workpiece is clamped against said mounting surfaces, said outer ring being rotatable about said axis of rotation,
   wherein in said unclamped position, said inner nose portion is rotationally positionable about said axis such that a workpiece positioned against said mounting surfaces may be oriented relative to said clamp to a position at which, with said clamp being operated to said clamped position in contact with the workpiece, said workpiece is clamped against said mounting surfaces,
   the clamping effecting a coupling of said inner nose portion and said outer ring portion whereby with a clamped workpiece, said inner nose portion and said outer ring portion are rotatable together and are positionable about said axis.

2. The apparatus of claim 1 wherein said inner nose portion comprises two mounting surfaces with the mounting surfaces being oriented at 90 degrees with respect to one another.

3. The apparatus of claim 1 wherein at least one mounting surface includes at least one port for communicating with a source of vacuum.

4. The apparatus of claim 1 wherein at least one mounting surface includes at least one port for communicating with a source of positive fluid pressure.

5. The apparatus of claim 1 wherein said mounting surfaces are located on a mounting block on said nose portion.

6. The apparatus of claim 1 further comprising a controllable locking mechanism operable between a locked position, whereby said outer ring portion is locked in a predetermined rotational orientation, and an unlocked position whereby said outer ring portion is rotatable.

7. An apparatus for clamping a cutting blade in a grinding machine, said apparatus comprising:
   an inner nose portion comprising a plurality of mounting surfaces, said inner nose portion being rotatable about an axis of rotation,
   an outer ring portion comprising at least one clamp, said clamp being operable between an unclamped position retracted from a cutting blade and a clamped position in contact with a cutting blade wherein the cutting blade is clamped against said mounting surfaces, said outer ring being rotatable about said axis of rotation,
   wherein in said unclamped position, said inner nose portion is rotationally positionable about said axis such that a cutting blade positioned against said mounting surfaces may be oriented relative to said clamp to a position at which, with said clamp being operated to said clamped position in contact with the cutting blade, said cutting blade is clamped against said mounting surfaces,
   the clamping effecting a coupling of said inner nose portion and said outer ring portion whereby with a damped cutting blade, said inner nose portion and said outer ring portion are rotatable together and are positionable about said axis.

8. A method of positioning a workpiece in a machining position relative to a tool in a machine, said method comprising:
   providing an apparatus for clamping a workpiece in said machine, said apparatus comprising an inner nose portion comprising a plurality of mounting surfaces, said inner nose portion being rotatable about an axis of rotation, and an outer ring portion comprising at least one clamp, said clamp being operable between an unclamped position retracted from the workpiece and a clamped position in contact with the workpiece wherein the workpiece is clamped against said mounting surfaces, said outer ring being rotatable about said axis of rotation,
   positioning the workpiece against said plurality of mounting surfaces,
   rotating said nose portion to align said workpiece with said clamp,
   engaging said workpiece with said clamp, said engaging effectively coupling said nose portion to said outer ring portion,
   rotating said nose portion and said outer ring portion to a predetermined position whereby said workpiece is placed in a machining position relative to said tool.

* * * * *

UNITED STATES PATENT AND TRADEMARK OFFICE
CERTIFICATE OF CORRECTION

PATENT NO. : 6,824,449 B2
DATED : November 23, 2004
INVENTOR(S) : Luciano B. Bonanni and Anthony Tenore It is certified that error appears in the above-identified patent and that said Letters Patent is hereby corrected as shown below:

Title page,
Item [57], ABSTRACT, "dues" should read -- due --.

Column 1,
Line 32, "contribute" should read -- contributes --.
Line 43, "limits" should read -- limit --.
Line 59, after "having", delete "a"

Column 2,
Line 15, after "from", delete "the".
Line 28, after "walls", insert -- . --.

Column 3,
Line 46, before "flux", insert -- of --.
Line 65, "comprise" should read -- comprises --.

Column 4,
Line 54, after "51", insert -- , --.

Column 5,
Line 2, "shaper" should read -- shaped --.

Column 6,
Line 1, after "plurality", insert -- of --.
Line 52, after "more", add -- of --.

Column 8,
Line 48, "preexisting" should read -- pre-existing --.

UNITED STATES PATENT AND TRADEMARK OFFICE
CERTIFICATE OF CORRECTION

PATENT NO. : 6,824,449 B2
DATED : November 23, 2004
INVENTOR(S) : Luciano B. Bonanni and Anthony Tenore It is certified that error appears in the above-identified patent and that said Letters Patent is hereby corrected as shown below:

<u>Column 9,</u>
Line 10, after "layers", insert -- and distinct from said pole pieces --.
Line 21, after "are" delete "is".
Line 22, "is" should read -- are --.
Line 39, "extends" should read -- extend --.

Signed and Sealed this

Twelfth Day of April, 2005

JON W. DUDAS
*Director of the United States Patent and Trademark Office*

UNITED STATES PATENT AND TRADEMARK OFFICE
CERTIFICATE OF CORRECTION

PATENT NO.     : 6,824,449 B2
DATED          : November 30, 2004
INVENTOR(S)    : Michael G. Regna et al.

It is certified that error appears in the above-identified patent and that said Letters Patent is hereby corrected as shown below:

This certificate supersedes Certificate of Correction issued April 12, 2005, the number was erroneously mentioned and should be vacated since no Certificate of Correction was granted.

Signed and Sealed this

Sixth Day of September, 2005

JON W. DUDAS
*Director of the United States Patent and Trademark Office*